United States Patent [19]

Ohgami

[11] Patent Number: 5,430,789
[45] Date of Patent: Jul. 4, 1995

[54] CELLULAR MOBILE BASE STATION APPARATUS FOR SERVING A FIRST AND SECOND CELL ZONES

[75] Inventor: Naoto Ohgami, Tokyo, Japan
[73] Assignee: NEC Corporation, Tokyo, Japan
[21] Appl. No.: 145,574
[22] Filed: Nov. 4, 1993
[30] Foreign Application Priority Data
   Nov. 4, 1992 [JP] Japan ................. 4-295024
[51] Int. Cl.$^6$ ............................. H04Q 7/30
[52] U.S. Cl. .................. 379/58; 370/95.3; 371/42; 455/33.1
[58] Field of Search ........... 379/59, 58; 455/33.1, 455/33.2, 347; 370/95.1; 371/42

[56] References Cited

U.S. PATENT DOCUMENTS

| | | | |
|---|---|---|---|
| D. 342,249 | 12/1993 | Beaumont | D14/142 |
| 5,084,891 | 1/1992 | Ariyavisitakul | 371/42 |
| 5,212,804 | 5/1993 | Choate | 455/33.1 |
| 5,243,598 | 9/1993 | Lee | 370/95.3 |

FOREIGN PATENT DOCUMENTS

92/12579  7/1992  WIPO.

OTHER PUBLICATIONS

Patent Abstracts of Japan, vol. 18, No. 84 (E-1506), May 11, 1993.
S. Uebayashi et al., "Base Station Equipment Technologies for Digital Cellular Systems", NTT Review, vol. 4, No. 1, Jan. 1992, pp. 55–63.

Primary Examiner—Curtis Kuntz
Assistant Examiner—William Cumming
Attorney, Agent, or Firm—Sughrue, Mion, Zinn, Macpeak & Seas

[57] ABSTRACT

A cellular mobile base station apparatus comprises a first plurality of transceivers operating in a first radio frequency range assigned to a first cell and receiving power from a first power supply unit, a second plurality of transceivers operating in a second radio frequency range assigned to a second cell and receiving power from the first power supply unit, a third plurality of transceivers operating in the first radio frequency range and receiving power from a second power supply unit, and a fourth plurality of transceivers operating in the second radio frequency range and receiving power from the second power supply unit. The outputs of the first and third pluralities of transceivers are combined and transmitted from a first antenna and a signal in the first frequency range received by the first antenna is decomposed into first frequency range individual signals and applied to the first and third pluralities of transceivers. The outputs of the second and fourth pluralities of transceivers are combined and transmitted from a second antenna, and a signal in the second frequency range received by the second antenna is decomposed into second frequency range individual signals and applied to the second and fourth pluralities of transceivers.

6 Claims, 4 Drawing Sheets

CELLULAR MOBILE BASE STATION APPARATUS FOR SERVING A FIRST AND SECOND CELL ZONES

BACKGROUND OF THE INVENTION

1. Field of the Invention

The present invention relates generally to cellular mobile communication systems and more specifically to a base station apparatus of the system.

2. Description of the Related Art

As illustrated in FIGS. 1 and 2, the base station apparatus of a conventional time-division multiple access (TDMA) cellular mobile communication system is comprised of a common control unit 1 which is connected to a mobile telephone switching office (MTSO), not shown, to provide overall control of the base station. Common control unit 1 is powered by a power supply unit 2 and mounted on an upper shelf 3 of the apparatus frame with the power supply unit 2. The base station serves two cells to which frequency ranges 1.5 GHz and 800 MHz, for example, are assigned respectively. To serve the 1.5-GHz range cell, a plurality of radio transceiver panels 4 are provided which are connected to the common control unit I and commonly powered by a power supply unit 5. Each transceiver panel 4 has a bandwidth of 0.25 MHz in the 1.5-GHz range and three time slots are multiplexed in the 0.25 MHz band of each transceiver. The transceiver panels 4 and power supply unit 5 are both mounted side by side on a middle shelf 6. The output terminal of each transceiver panel 4 is connected to a frequency division multiplexer 7A where it is multiplexed with the outputs of other transceivers and supplied to a diplexer 9A and transmitted from antenna 10A. Signals from mobile units located in the 1.5-GHz range cell are received by antenna 10A and fed through diplexer 9A to a frequency division demultiplexer 8A where they are decomposed into individual frequency signals and supplied respectively to transceiver panels 4. To serve the 800-MHz range cell zone, a plurality of radio transceivers 14 are provided which are connected to the control unit 1, powered by a power supply unit 15 and mounted side by side on a lower shelf 16. Each transceiver panel 14 has a bandwidth of 0.25 MHz in the 800-MHz range and three time slots are multiplexed in the 0.25 MHz band of each transceiver. The output terminal of each transceiver panel 14 is connected to a frequency division multiplexer 7B where it is multiplexed with the outputs of other transceivers 14 and supplied to a diplexer 9B and transmitted from antenna 10B. Signals from mobile units located in the 800-MHz range cell zone are received by antenna 108 and fed through diplexer 9B to a frequency demultiplexer 8B where they are decomposed into individual frequency signals and supplied respectively to transceiver panels 14. The control unit I receives an incoming call from the MTSO and, in response, selects one of the transceivers and one of the time slots assigned to it, depending on the destination address of the incoming call, and operates the selected transceiver for transmission to a mobile station. In return, a signal sent from the mobile station is received through demultiplexer 8A by the selected transceiver and applied through control unit 1 to the MTSO.

If any one of the power supply units 5 and 15 should fail, all transceivers powered by the failed power supply become inoperative and service breakdown occurs in the cell served by the failed transceivers.

SUMMARY OF THE INVENTION

It is therefore an object of the present invention to provide a base station apparatus which prevents the total service breakdown of a cell zone, which is serviced by a particular frequency range of transceiver panels, due to failure of one of the transceiver power supply unit.

According to the present invention, there is provided a base station apparatus for a cellular mobile communication system in which different frequency ranges are assigned respectively to cells and the base station apparatus serves first and second cells. The apparatus comprises a first plurality of transceivers operating in a first radio frequency range assigned to the first cell and receiving power from a first power supply unit, a second plurality of transceivers operating in a second radio frequency range assigned to the second cell and receiving power from the first power supply unit, a third plurality of transceivers operating in the first radio frequency range and receiving power from a second power supply unit, and a fourth plurality of transceivers operating in the second radio frequency range and receiving power from the second power supply unit. The outputs of the first and third pluralities of transceivers are combined and transmitted from a first antenna and a signal in the first frequency range received by the first antenna is decomposed into first frequency range Individual signals and coupled to the first and third pluralities of transceivers. The outputs of the second and fourth pluralities of transceivers are, on the other hand, combined and transmitted from a second antenna, and a signal in the second frequency range received by the second antenna is decomposed into second frequency range individual signals and coupled to the second and fourth pluralities of transceivers.

BRIEF DESCRIPTION OF THE DRAWINGS

The present invention will be described in further detail with reference to the accompanying drawings, in which.

DETAILED DESCRIPTION

Figure 1:
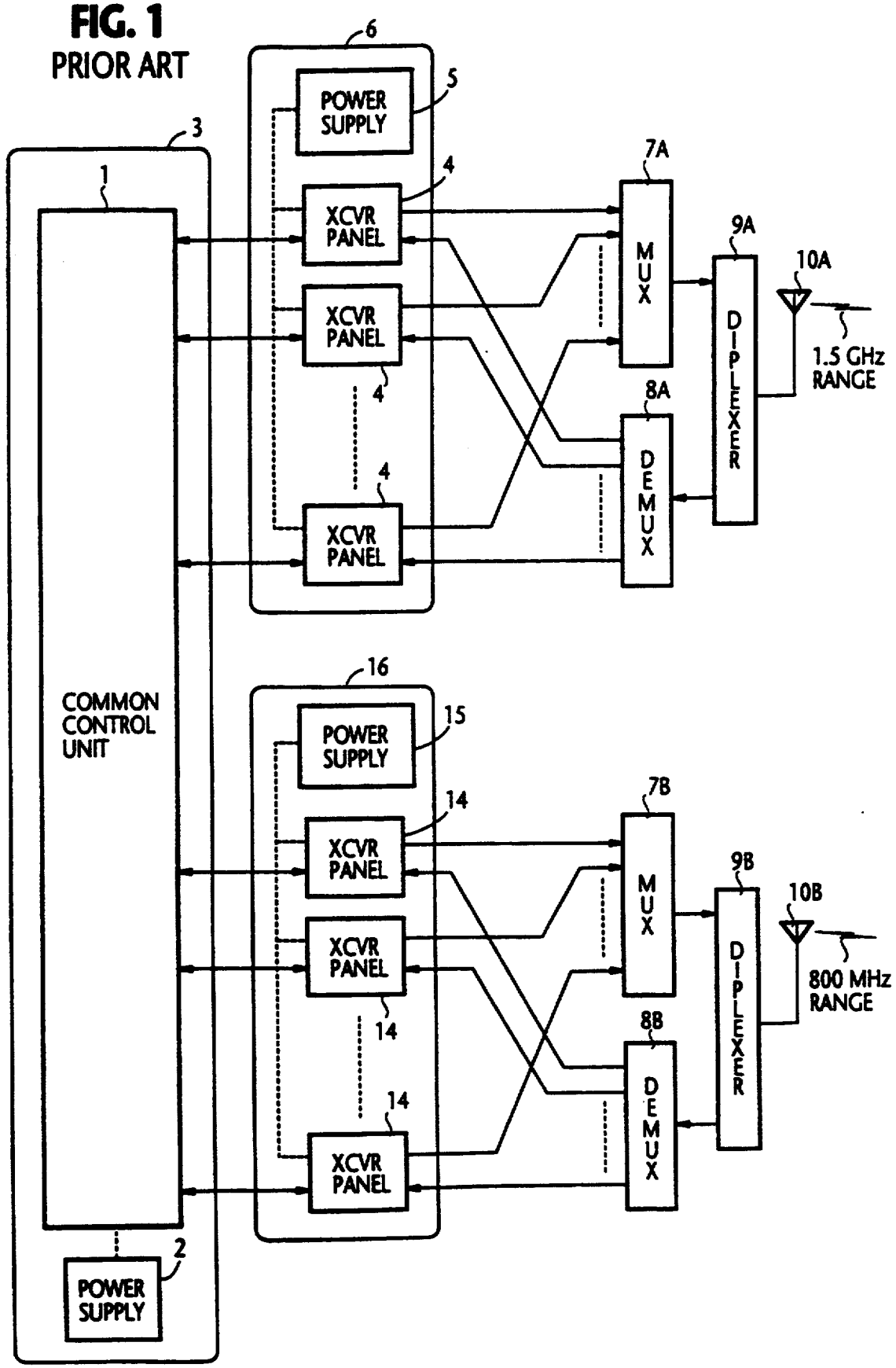
FIG. 1 is a block diagram of a prior art base station apparatus of a time-division multiple access cellular mobile communication system.
Figure 2:
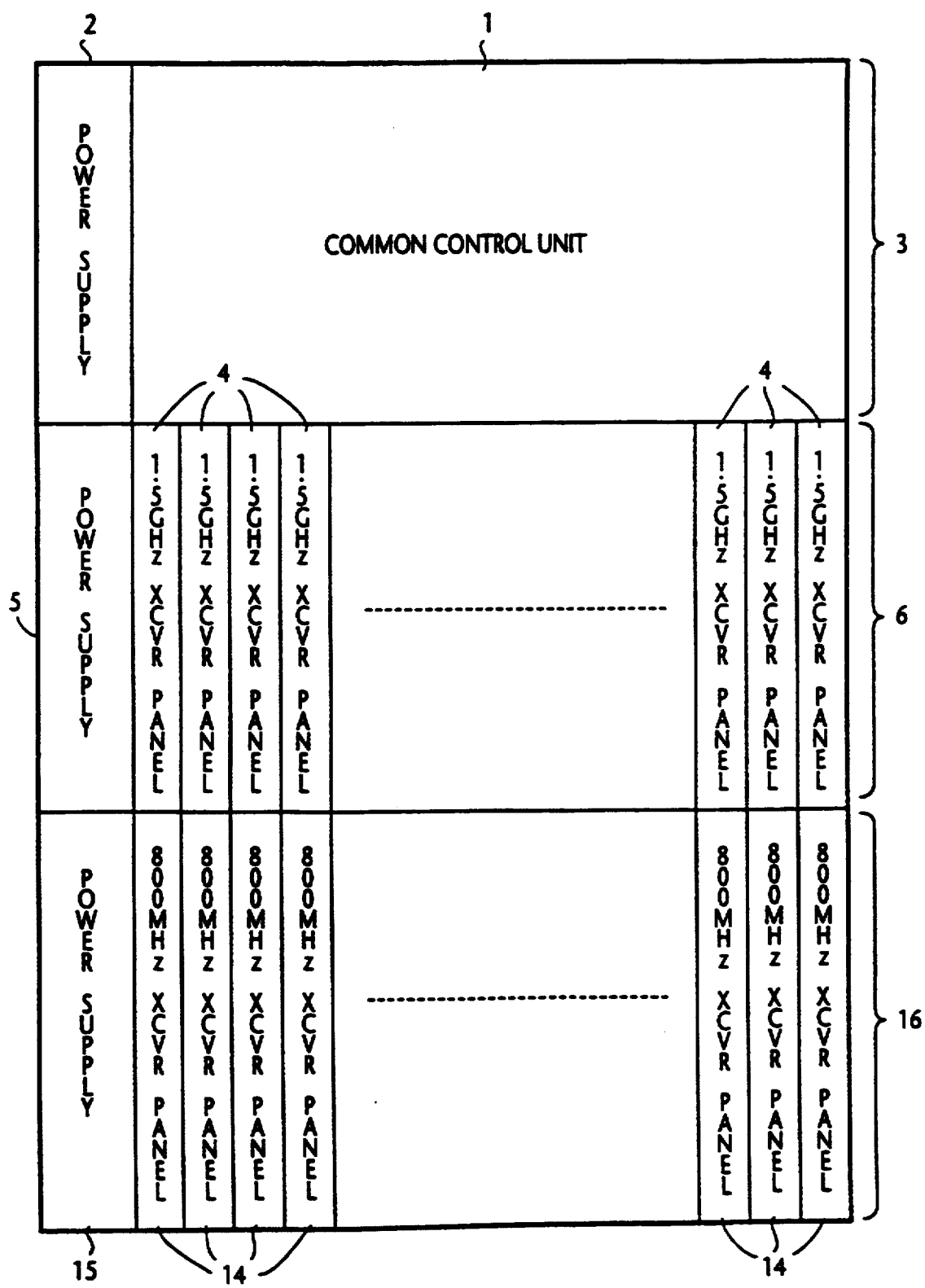
FIG. 2 is a front view of a frame in which the prior art base station apparatus is mounted.
Figure 3:
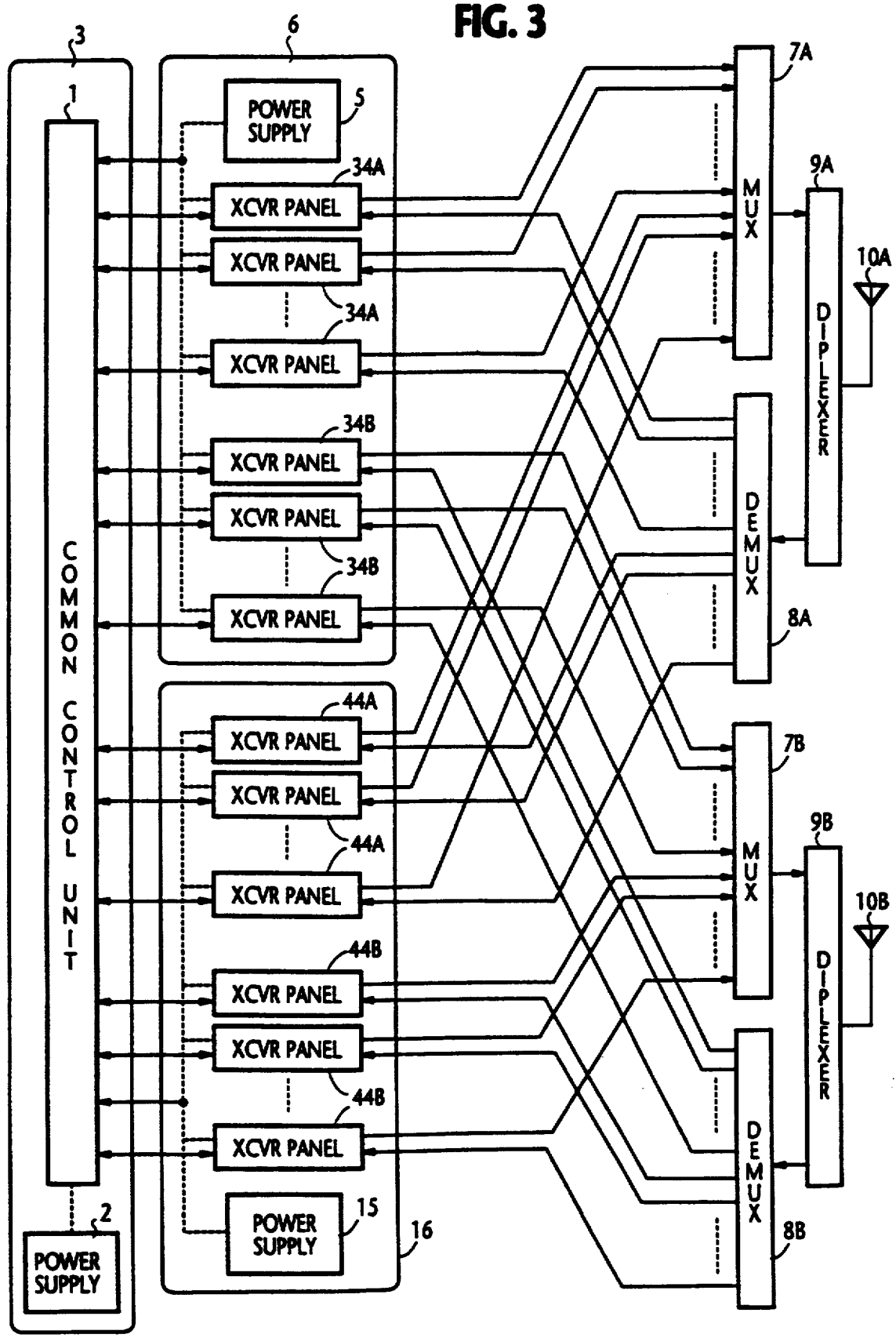
FIG. 3 is a block diagram of a base station apparatus of a time-division multiple access cellular mobile communication system according to the present invention.
Figure 4:
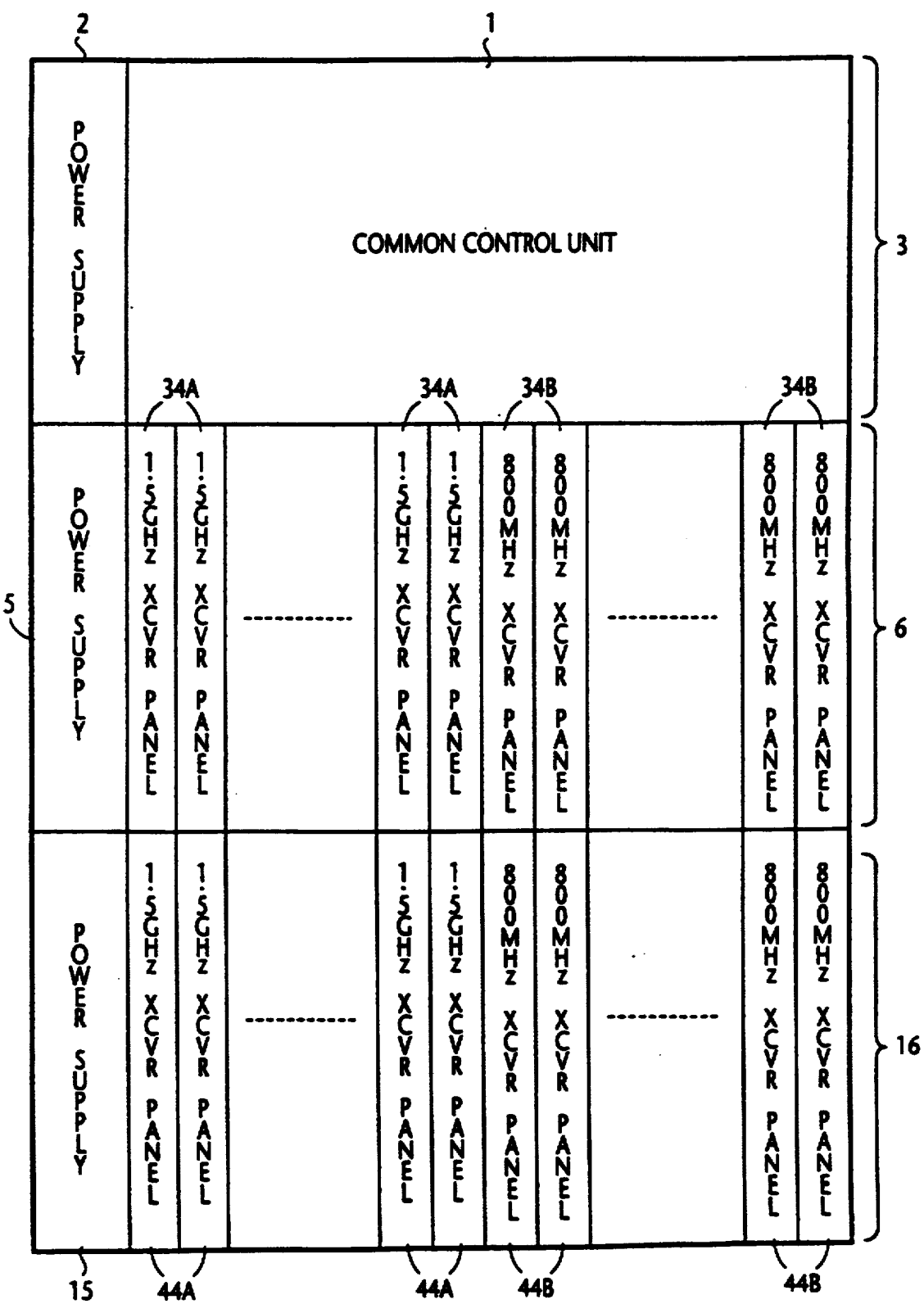
FIG. 4 is a front view of a frame in which the base station apparatus of the present Invention Is mounted.

Referring now to FIGS. 3 and 4, there is shown a base-station apparatus of the present invention wherein parts corresponding to those in FIGS. 1 and 2 are indicated by the same numerals as used in FIGS. 1 and 2 and operate in the same manner as described previously. It is seen in FIG. 4 that on the middle shelf 6 a group of 1.5-GHz range transceiver panels 34A and a group of 800-MHz range transceiver panels 34B are mounted side by side and on the lower shelf 16 a group of 1.5-GHz range transceiver panels 44A and a group of 800-MHz range transceiver panels 44B are mounted side by side. All transceiver panels 34A and 34B on shelf 6 are commonly powered by the power supply unit 5 and all transceiver panels 44A and 44B on shelf 16 are commonly powered by the power supply unit 15. Each of the transceivers 34A and 44A has a bandwidth of 0.25 MHz in the 1.5 GHz range, and each of the transceivers 34B and 44B has a bandwidth of 0.25 MHz In the 800 MHz range. Three time slots are multiplexed into the 0.25 -MHz band of each of the transceivers 34A, 34B, 44A and 44B.

The outputs of all 1.5-GHz range transceivers 34A and 44A are connected to frequency division multiplexer 7A, while the outputs of all 800-MHz range transceivers 34B and 44B are connected to frequency division multiplexer 7B. The 1.5-GHz range signals received by antenna 10A are coupled through diplexer 9A to frequency division demultiplexer 8A where they are demultiplexed into individual frequency signals in the 1.5-GHz range, These 1.5-GHz time-slot signals are coupled respectively to the transceiver panels 314A on middle shelf 6 and transceiver panels 44A on lower shelf 16. On the other hand, the 800-MHz range signals received by antenna 10B are coupled through diplexer 9B to frequency division demultiplexer 8B where they are demultiplexed into individual frequency signals in the 800-MHz range, which are coupled respectively to the transceiver panels 34B on shelf 6 and transceiver panels 44B on shelf 16.

Control unit I monitors the power supply units 5 and 15 to isolate those transceivers from the system whose associated power supply unit has failed.

During normal operation, control unit 1 makes a search through all the transceivers on shelves 6 and 16 for an idle one in response to receipt of an incoming call from the MTSO, not shown.

If the power supply unit 5 should fail, all transceivers on shelf 6 becomes Inactive, and control unit 1 isolates them from the system and makes a search exclusively through the transceivers on shelf 16 for an idle transceiver. Since the power supply unit 15 still supports the 1.5 GHz and 800 MHz range transceivers on shelf 16, total service breakdown of one of the cell zones which is serviced by a particular frequency range of transceiver panels, is prevented.

What is claimed is:

1. A base station apparatus for a cellular mobile communication system in which different frequency ranges are assigned respectively to cell zones and the base station apparatus serves first and second cell zones, comprising;
    a first power supply unit;
    a first plurality of transceivers operating in a first radio frequency range assigned to the first cell zone and receiving power from said first power supply unit;
    a second plurality of transceivers operating in a second radio frequency range assigned to the second cell zone and receiving power from said first power supply unit;
    a second power supply unit;
    a third plurality of transceivers operating in said first radio frequency range and receiving power from said second power supply unit;
    a fourth plurality of transceivers operating in said second radio frequency range and receiving power from said second power supply unit;
    first combining means for combining outputs of said first and third pluralities of transceivers and transmitting the combined outputs from a first antenna;
    first decomposing means for decomposing a signal in said first frequency range received by the first antenna into first frequency range individual signals and coupling the first frequency range individual signals to said first and third pluralities of transceivers;
    second combining means for combining outputs of said second and fourth pluralities of transceivers and transmitting the combined outputs from a second antenna;
    second decomposing means for decomposing a signal in said second frequency range received by the second antenna into second frequency range individual signals and coupling the second frequency range individual signals to said second and fourth pluralities of transceivers; and
    a control unit for monitoring said first and second power supply units, said control unit being responsive to receipt of an incoming call from a mobile switching office for making a search through all of said transceivers for an idle transceiver when both of said first and second power supply units are normally operating, making a search through said third and fourth pluralities of transceivers for an idle transceiver when said first power supply unit fails, and making a search through said first and second pluralities of transceivers for an idle transceiver when said second power supply unit fails.

2. A base station apparatus as claimed in claim 1, wherein said first and second pluralities of transceivers are in the form of panels which are mounted side by side with said first power supply unit on a first shelf, and said third and fourth pluralities of transceivers are in the form of panels which are mounted side by side with said second power supply unit on a second shelf.

3. A base station apparatus for a cellular mobile communication system in which different frequency ranges are assigned respectively to cell zones and the base station apparatus serves first and second cell zones, comprising;
    a first power supply unit;
    a first plurality of transceivers operating in a first radio frequency range assigned to the first cell zone and receiving power from said first power supply unit;
    a second plurality of transceivers operating in a second radio frequency range assigned to the second cell zone and receiving power from said first power supply unit;
    a second power supply unit;
    a third plurality of transceivers operating in said first radio frequency range assigned to said first cell zone and receiving power from said second power supply unit;
    a fourth plurality of transceivers operating in said second radio frequency range assigned to said second cell zone and receiving power from said second power supply unit;
    first combining means for combining outputs of said first and third pluralities of transceivers and transmitting the combined outputs from a first antenna;
    first decomposing means for decomposing a signal in said first frequency range received by the first antenna into first frequency range individual signals and coupling the first frequency range individual signals to said first and third pluralities of transceivers;

second combining means for combining outputs of said second and fourth pluralities of transceivers and transmitting the combined outputs from a second antenna; and second decomposing means for decomposing a signal in said second frequency range received by the second antenna into second frequency range individual signals and coupling the second frequency range individual signals to said second and fourth pluralities of transceivers.

4. A base station apparatus as claimed in claim 3, wherein said first and second pluralities of transceivers are in the form of panels which are mounted side by side with said first power supply unit on a first shelf, and said third and fourth pluralities of transceivers are in the form of panels which are mounted side by side with said second power supply unit on a second shelf.

5. A base station apparatus as claimed in claim 3, further comprising a control unit for monitoring said first and second power supply units, said control unit being connected to a mobile switching office and responsive to receipt of an incoming call therefrom for making a search through all of said transceiver for an idle transceiver when both of said power supply units are normally operating, making a search through said third and fourth pluralities of transceivers for an idle transceiver when said first power supply unit fails, and making a search through said first and second pluralities of transceivers for an idle transceiver when said second power supply unit fails.

6. A base station apparatus for a cellular mobile communication system in which different frequency ranges are assigned respectively to cell zones and the base station apparatus serves first and second cell zones, comprising;

a first power supply unit;

a first plurality of transceivers operating in a first radio frequency range assigned to the first cell zone and receiving power from said first power supply unit;

a second plurality of transceivers operating in a second radio frequency range assigned to the second cell zone and receiving power from said first power supply unit;

a second power supply unit;

a third plurality of transceivers operating in said first radio frequency range assigned to said first cell zone and receiving power from said second power supply unit;

a fourth plurality of transceivers operating in said second radio frequency range assigned to said second cell zone and receiving power from said second power supply unit;

first combining means for combining outputs of said first and third pluralities of transceivers and transmitting the combined outputs from a first antenna;

first decomposing means for decomposing a signal in said first frequency range received by the first antenna into first frequency range individual signals and coupling the first frequency range individual signals to said first and third pluralities of transceivers;

second combining means for combining outputs of said second and fourth pluralities of transceivers and transmitting the combined outputs from a second antenna;

second decomposing means for decomposing a signal in said second frequency range received by the second antenna into second frequency range individual signals and coupling the second frequency range individual signals to said second and fourth pluralities of transceivers; and a control unit for monitoring said first and second power supply units, said control unit being connected to a mobile switching office and responsive to receipt of an incoming call therefrom for making a search through all of said transceiver for an idle transceiver when both of said power supply units are normally operating, making a search through said third and fourth pluralities of transceivers for an idle transceiver when said first power supply unit fails, and making a search through said first and second pluralities of transceivers for an idle transceiver when said second power supply unit fails;

wherein said first and second pluralities of transceivers and said first power supply unit are mounted on a first shelf, and said third and fourth pluralities of transceivers and said second power supply unit are mounted on a second shelf.

* * * * *

UNITED STATES PATENT AND TRADEMARK OFFICE
CERTIFICATE OF CORRECTION

PATENT NO. : 5,430,789
DATED : July 4, 1995
INVENTOR(S) : Naoto OHGAMI

It is certified that error appears in the above-indentified patent and that said Letters Patent is hereby corrected as shown below:

Col. 2, line 10, delete "unit", insert -- units --

Col. 3, line 19, delete "314A", insert -- 34A --

Signed and Sealed this

Seventeenth Day of October, 1995

Attest:

BRUCE LEHMAN

Attesting Officer

Commissioner of Patents and Trademarks